(12) United States Patent
Ting et al.

(10) Patent No.: US 8,419,027 B2
(45) Date of Patent: Apr. 16, 2013

(54) STEERING APPARATUS FOR A VEHICLE HAVING TWO FRONT WHEELS

(75) Inventors: Hsin-Chih Ting, Kaohsiung (TW);
Yen-Hsiu Lee, Kaohsiung (TW);
Chun-Hao Huang, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 82 days.

(21) Appl. No.: 13/174,509

(22) Filed: Jun. 30, 2011

(65) Prior Publication Data
US 2012/0161410 A1    Jun. 28, 2012

(30) Foreign Application Priority Data

Jul. 6, 2010    (TW) .............................. 99122171 A

(51) Int. Cl.
*B62D 7/16*    (2006.01)
(52) U.S. Cl.
USPC ............. 280/93.511; 280/93.51; 280/5.509; 280/124.103; 403/57
(58) Field of Classification Search ........... 280/124.103, 280/5.509, 93.508, 93.502, 93.511, 93.51; 403/57, 128, 131, 78, 164; 180/210
See application file for complete search history.

(56) References Cited

U.S. PATENT DOCUMENTS

| | | | | | |
|---|---|---|---|---|---|
| 2,157,401 | A | * | 5/1939 | Craver | ........................ 403/131 |
| 2,206,970 | A | * | 7/1940 | Megow | .................. 280/124.103 |
| 2,960,341 | A | * | 11/1960 | Emrick | ....................... 74/579 R |
| 3,218,098 | A | * | 11/1965 | Rowlett | ........................ 403/155 |
| 3,300,258 | A | * | 1/1967 | Kompanek, Jr. et al. | ..... 384/280 |
| 3,441,299 | A | * | 4/1969 | Pfaar | ............................ 403/131 |
| 3,495,859 | A | * | 2/1970 | Morris | ......................... 403/145 |
| 4,088,199 | A | * | 5/1978 | Trautwein | ..................... 180/209 |
| 4,480,553 | A | * | 11/1984 | Scheffel | ........................ 105/167 |
| 4,601,602 | A | * | 7/1986 | Schnitzler | ....................... 403/56 |
| 4,613,250 | A | * | 9/1986 | Laucus | ........................... 403/11 |
| 4,634,137 | A | * | 1/1987 | Cocksedge | .................... 280/256 |

(Continued)

FOREIGN PATENT DOCUMENTS

DE    10 2008 008 731 A1    8/2009
EP    1 090 832 A1    4/2001

(Continued)

OTHER PUBLICATIONS

EPO Office Action dated Jun. 12, 2012 issued in corresponding European Patent Application No. 11 172 738.4, 8 pages.

(Continued)

*Primary Examiner* — Paul Dickson
*Assistant Examiner* — Nicole Verley
(74) *Attorney, Agent, or Firm* — Christie, Parker & Hale, LLP

(57) ABSTRACT

A steering apparatus includes a first joint disposed on a control rod that extends rotatably through a head tube, two second joints disposed respectively on two suspension units, and two connecting bars each connected between the first joint and a respective one of the second joints. The first joint includes a seat disposed fixedly on the control rod, at least one first rotating member having a central axis and rotatable on the seat about the central axis of the first rotating member, and at least one second rotating member having a central axis and rotatable on the first rotating member about the central axis of the second rotating member. The axes of the first and second rotating members of the first joint are perpendicular to each other.

7 Claims, 12 Drawing Sheets

U.S. PATENT DOCUMENTS

| | | | | |
|---|---|---|---|---|
| 5,062,730 A * | 11/1991 | Tomii et al. | .................... | 403/57 |
| 5,186,483 A * | 2/1993 | Sheppard | ..................... | 280/494 |
| 5,433,394 A * | 7/1995 | Brozio | ............................ | 242/283 |
| 5,765,844 A | 6/1998 | Wood | ........................ | 280/93.509 |
| 6,203,038 B1 * | 3/2001 | Bernhard | .................. | 280/93.502 |
| 6,287,206 B1 * | 9/2001 | Stage | ............................ | 464/119 |
| 6,334,623 B1 * | 1/2002 | Kinouchi et al. | ........ | 280/93.513 |
| 6,367,824 B1 * | 4/2002 | Hayashi | .......................... | 280/62 |
| 6,375,205 B1 * | 4/2002 | De Fontenay et al. | ... | 280/93.502 |
| 6,612,594 B2 * | 9/2003 | Engels et al. | ............ | 280/93.502 |
| 6,631,653 B2 * | 10/2003 | Brickner et al. | ......... | 74/471 XY |
| 6,817,617 B2 * | 11/2004 | Hayashi | ..................... | 280/5.509 |
| 7,073,806 B2 * | 7/2006 | Bagnoli | ........................ | 280/267 |
| 7,347,434 B2 * | 3/2008 | Lewis et al. | ..................... | 280/99 |
| 7,398,984 B2 * | 7/2008 | Tucker | .................. | 280/124.116 |
| 7,494,141 B2 * | 2/2009 | Bouton | .................. | 280/124.103 |
| 7,648,148 B1 * | 1/2010 | Mercier | ................. | 280/124.103 |
| 7,731,210 B2 * | 6/2010 | Pedersen | ................ | 280/124.103 |
| 7,845,666 B2 * | 12/2010 | Lynch et al. | ................... | 280/282 |
| 7,914,023 B2 * | 3/2011 | Zaloga et al. | ............ | 280/93.511 |
| 8,001,873 B2 * | 8/2011 | Peng | .......................... | 81/177.75 |
| 8,016,302 B1 * | 9/2011 | Reeve | .............................. | 280/62 |
| 8,132,820 B2 * | 3/2012 | Lee | ............................ | 280/93.512 |
| 8,230,827 B2 * | 7/2012 | Jaquet | ............................ | 123/56.1 |
| 8,333,526 B2 * | 12/2012 | Long | ................................ | 403/57 |
| 2004/0051269 A1 * | 3/2004 | Bouton | .................. | 280/124.103 |
| 2004/0094926 A1 * | 5/2004 | Engels et al. | .............. | 280/93.51 |
| 2007/0290472 A1 * | 12/2007 | Audibert | .................. | 280/93.502 |
| 2008/0067768 A1 * | 3/2008 | Yang | ........................ | 280/93.502 |
| 2008/0115994 A1 * | 5/2008 | Martini et al. | ................ | 180/210 |
| 2009/0041535 A1 * | 2/2009 | Hu | .................................... | 403/57 |
| 2009/0170615 A1 * | 7/2009 | Horwath et al. | ............. | 464/136 |
| 2010/0230921 A1 * | 9/2010 | Zaloga et al. | ............ | 280/93.511 |

FOREIGN PATENT DOCUMENTS

| | | |
|---|---|---|
| EP | 1 391 374 A1 | 2/2004 |
| EP | 1 484 239 A2 | 12/2004 |
| EP | 1 561 612 B1 | 8/2005 |
| JP | 2010 42710 A | 2/2010 |

OTHER PUBLICATIONS

Extended European Search Report dated Aug. 17, 2011 issued in corresponding EP Application No. 11 17 2738, 5 pages.

* cited by examiner

US 8,419,027 B2

STEERING APPARATUS FOR A VEHICLE HAVING TWO FRONT WHEELS

CROSS-REFERENCE TO RELATED APPLICATION

This application claims priority of Taiwanese Application No. 099122171, filed on Jul. 6, 2010.

BACKGROUND OF THE INVENTION

1. Field of the Invention

This invention relates to a steering apparatus, and more particularly to a steering apparatus for a vehicle having two front wheels.

2. Description of the Related Art

Referring to FIG. 1, a conventional vehicle 1 having two front wheels includes a frame 11, a central rod 12 disposed pivotally on the frame 11, two suspension units 13 disposed respectively at two opposite sides of the steering rod 12, and a steering unit 15 connecting the suspension units 13 to the frame 11.

Each of the suspension units 13 includes a side rod 131 connected to a front wheel 132. The steering unit 15 includes a mounting seat 151 disposed on a bottom end of the central rod 12, two connecting seats 152 disposed respectively on the side rods 131 of the suspension units 13, and two connecting bars 153 each connected between the mounting seat 151 and the corresponding connecting seat 152. Each of the connecting bars 153 includes a bar body 154, and two joints 155 disposed respectively on two opposite ends of the bar body 154.

When the central rod 12 is rotated, the connecting bars 153 activate the connecting seats 152 to thereby drive rotation of the front wheels 132, so as to achieve steering function.

With further reference to FIG. 2, although rotation can be transferred between the mounting seat 151 and the connecting seats 152 through the bar bodies 154 and the joints 155 of the connecting bars 153, the maximum rotational angle 16 of the joints 155 is only about 22°. As a result, the steering angle of each of the front wheels 132 is limited to thereby affect adversely control of the vehicle 1. Moreover, when the front wheels 132 move on a bumped road surface such that the connecting seats 152 vibrate in a direction 17, since the maximum rotational angle 16 of the joints 155 is small, the joints 155 are subjected to a relatively large load, thereby reducing the service life of the joints 155.

SUMMARY OF THE INVENTION

The object of this invention is to provide a steering apparatus for a vehicle having two front wheels, which is convenient to turn the front wheels by a large angle and which has a long service life.

According to this invention, there is provided a steering apparatus for a vehicle, the vehicle including a frame having a head tube, a control rod extending rotatably through the head tube, a reclining unit disposed on the head tube, two suspension units connected to and disposed under the reclining unit, and two front wheels connected respectively to the suspension units, the reclining unit including two side tubes flanking the head tube, the suspension units extending respectively into the side tubes, the steering apparatus comprising a first joint adapted to be disposed on the control rod, two second joints adapted to be disposed respectively on the suspension units, and two connecting bars each connected between the first joint and a respective one of the second joints, wherein the first joint includes a seat adapted to be disposed fixedly on the control rod, at least one first rotating member having a central axis and rotatable on the seat about the central axis of the first rotating member, and at least one second rotating member having a central axis and rotatable on the first rotating member about the central axis of the second rotating member, the axes of the first and second rotating members of the first joint being perpendicular to each other.

Due to the presence of the first and second rotating members, controllability of the vehicle is improved, and the shock-absorbing ability of the steering apparatus is promoted to thereby prolong the service life of the steering apparatus.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
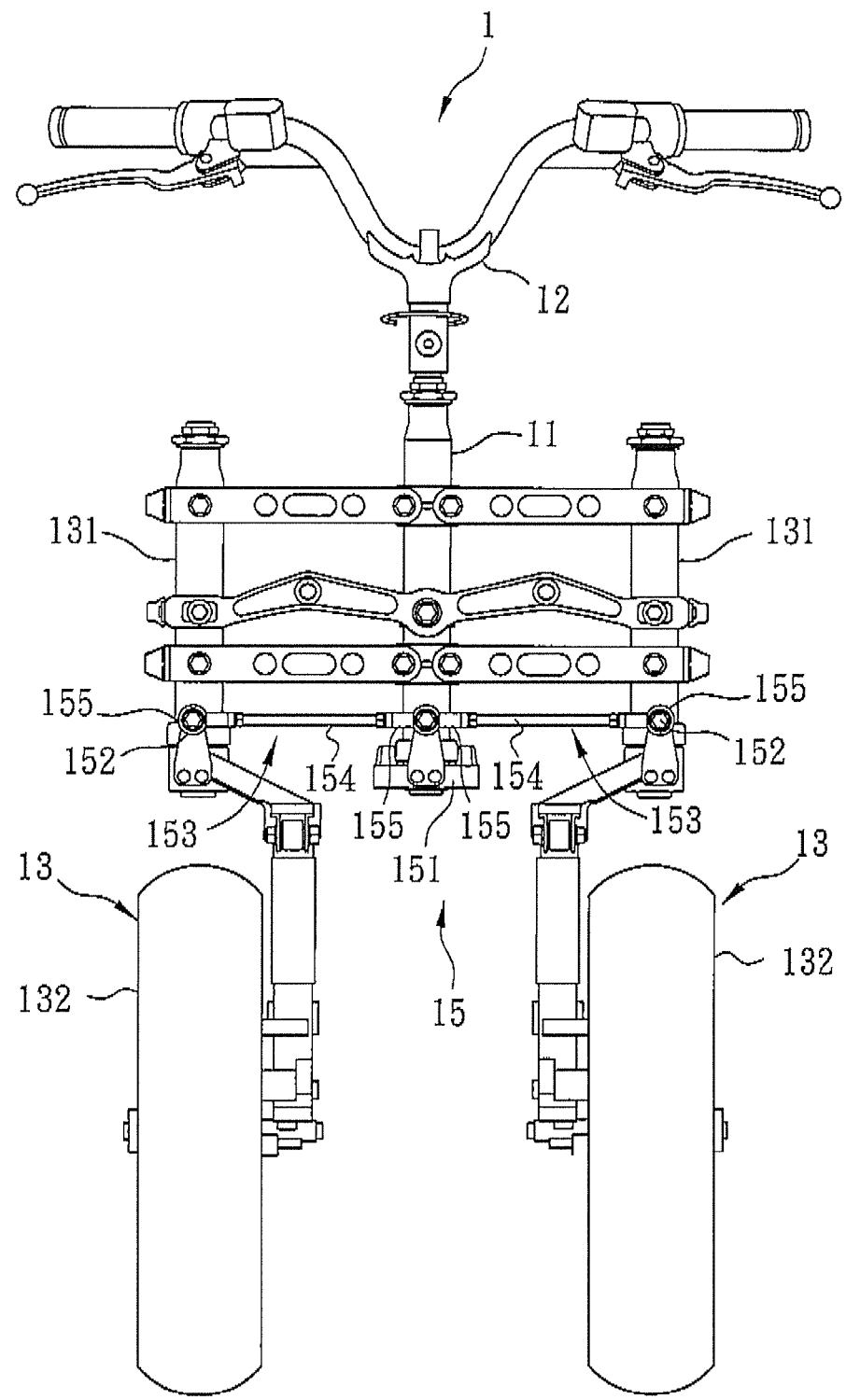
FIG. 1 is a schematic front view of a conventional vehicle having two front wheels.
Figure 2:
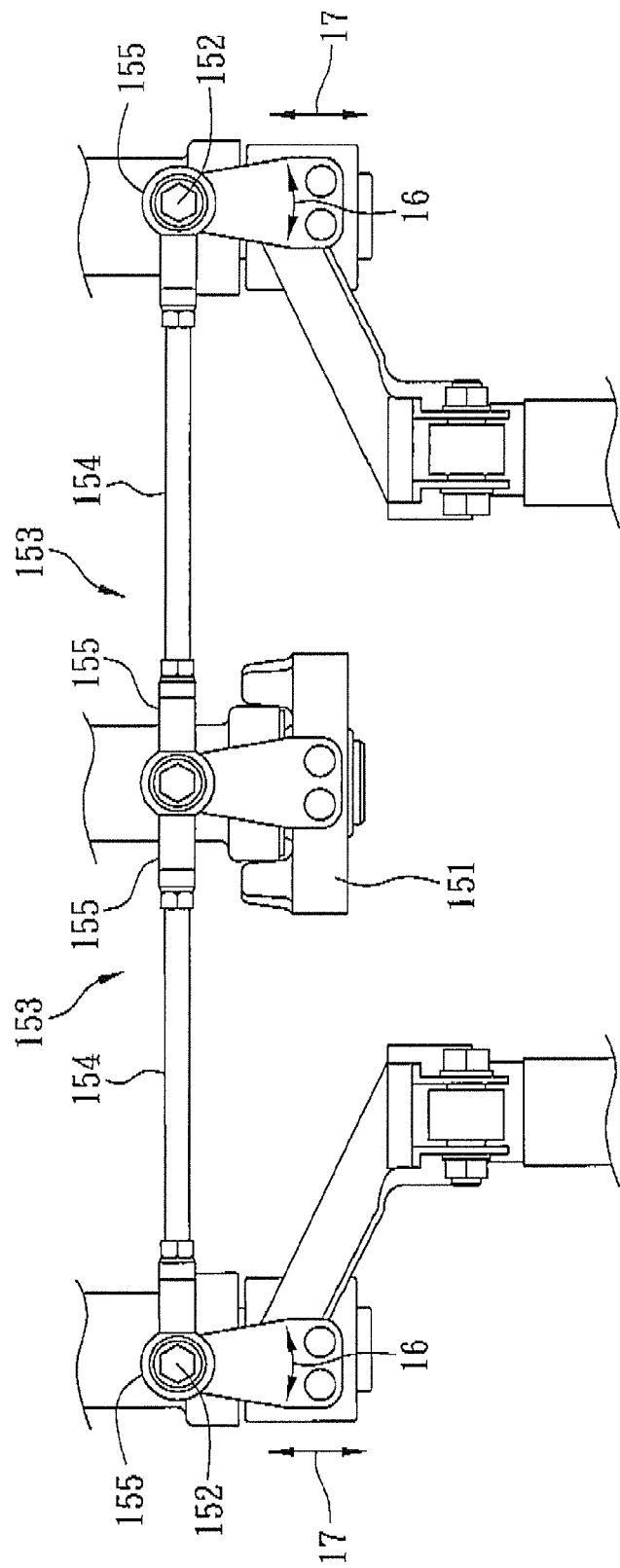
FIG. 2 is an enlarged view of a portion of the conventional vehicle.

Before the present invention is described in greater detail in connection with the preferred embodiments, it should be noted that similar elements and structures are designated by like reference numerals throughout the entire disclosure.

Figure 3:
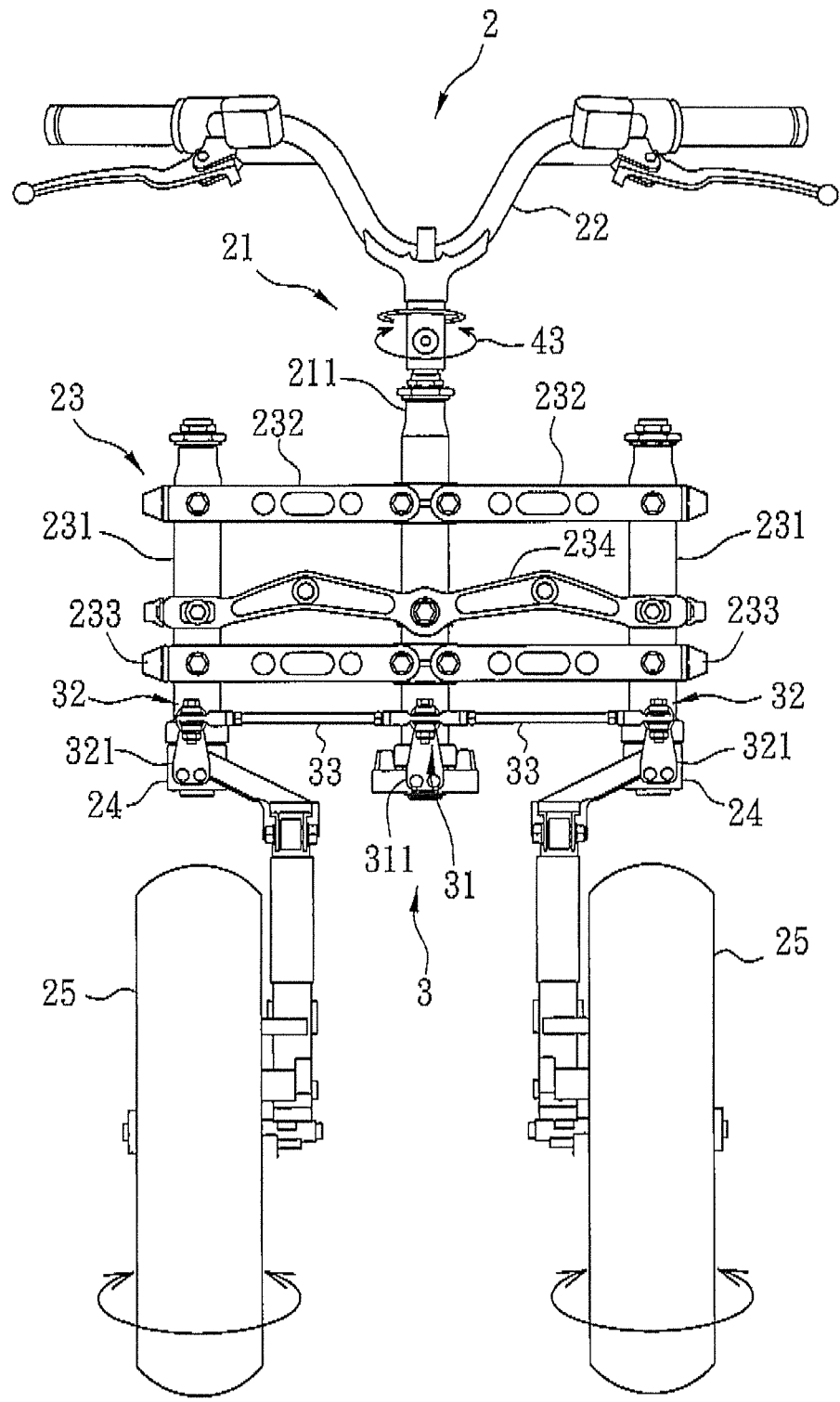
FIG. 3 is a schematic front view of a vehicle including the first preferred embodiment of a steering apparatus according to this invention.
Figure 4:
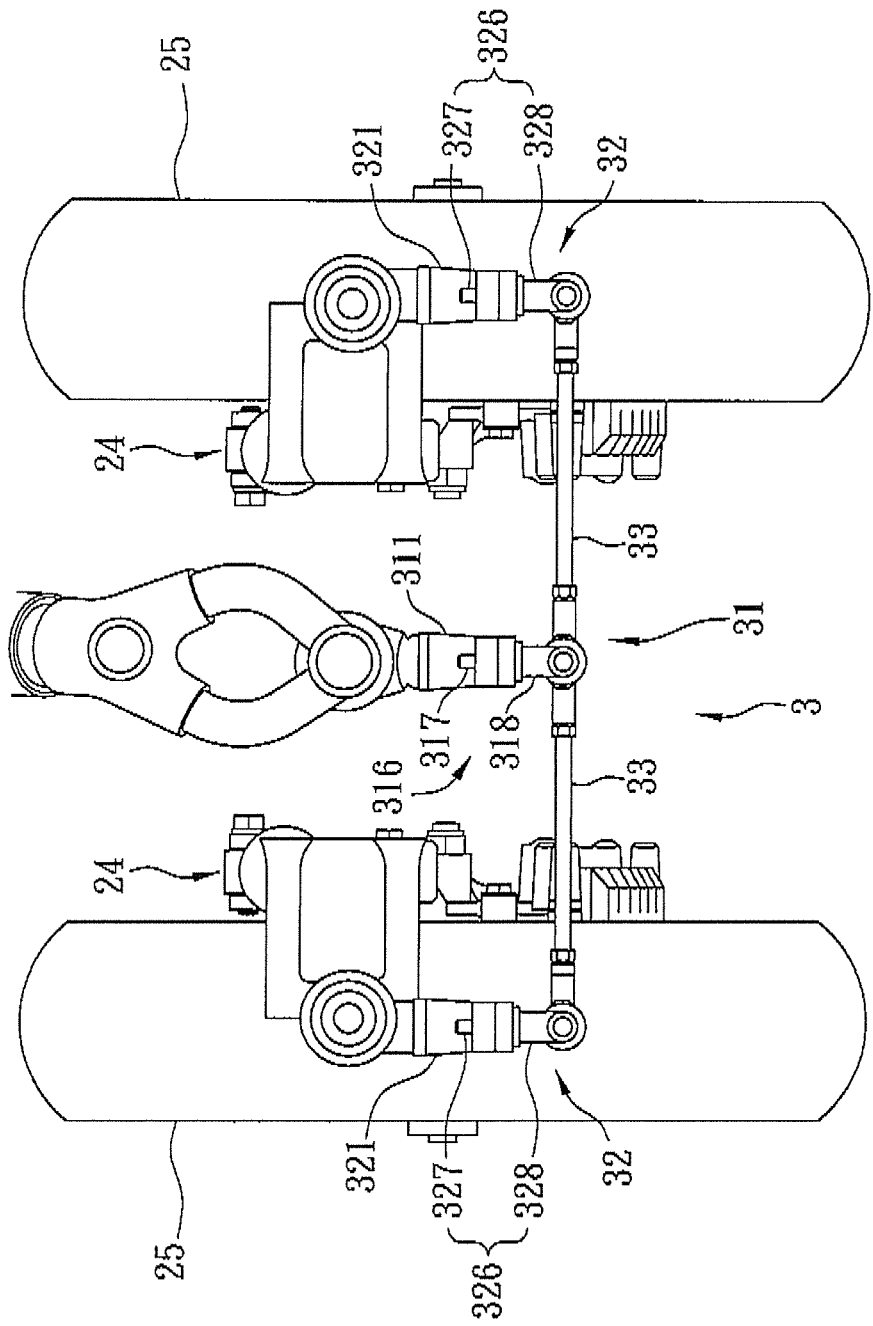
FIG. 4 is a fragmentary schematic top view of the vehicle including the first preferred embodiment.

Referring to FIGS. 3 and 4, the first preferred embodiment of a steering apparatus 3 according to this invention forms a portion of a vehicle 2. The vehicle 2 includes a frame 21 having a head tube 211, a control rod 22 extending rotatably through the head tube 211, a reclining unit 23 disposed on the head tube 211, two suspension units 24 disposed under and connected to the reclining unit 23, and two front wheels 25 connected respectively to the suspension units 24. The reclining unit 23 includes two side tubes 231 flanking the head tube 211, two horizontal upper links 232 each having two ends connected respectively and pivotally to the head tube 211 and a respective one of the side tubes 231, two horizontal lower links 233 each having two ends connected respectively and pivotally to the head tube 211 and the respective one of the side tubes 231, and a connecting rod 234 extending between the upper and lower links 232, 233 and connected pivotally to the head tube 211 and the side tubes 231. The suspension units 24 extend respectively into the side tubes 231.

The steering apparatus 3 includes a first joint 31 disposed on the control rod 22, two second joints 32 disposed respectively on the suspension units 24, and a connecting bar 33 each having two ends connected respectively to the first joint 31 and a respective one of the second joints 32.

Figure 5:
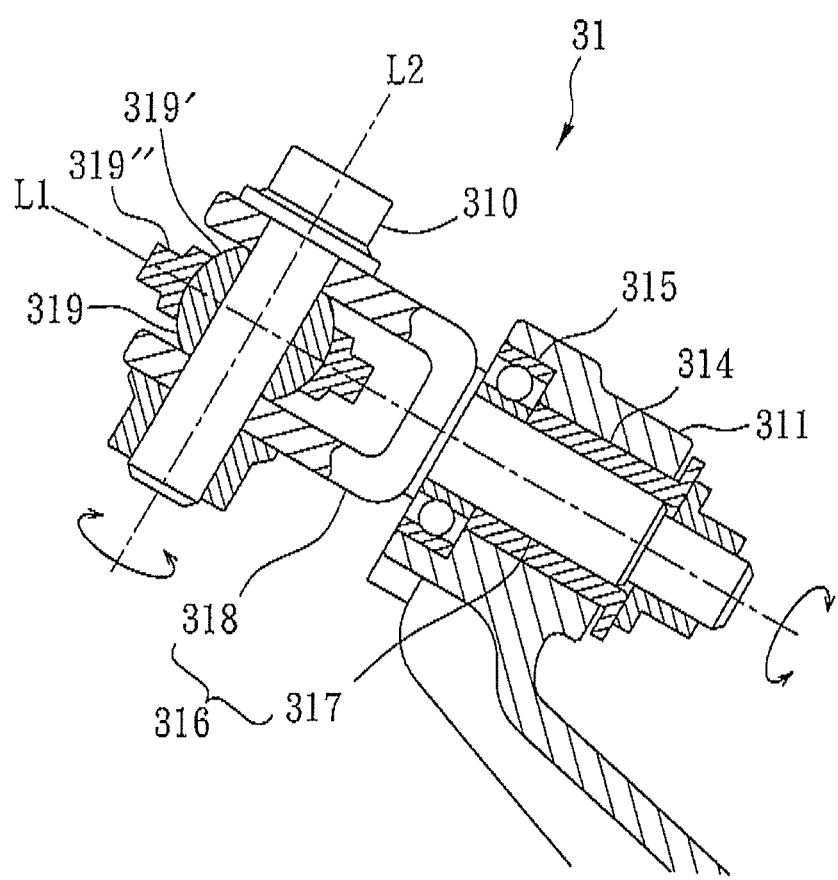
FIG. 5 is a partly sectional view of a first joint of the first preferred embodiment.
Figure 5A:
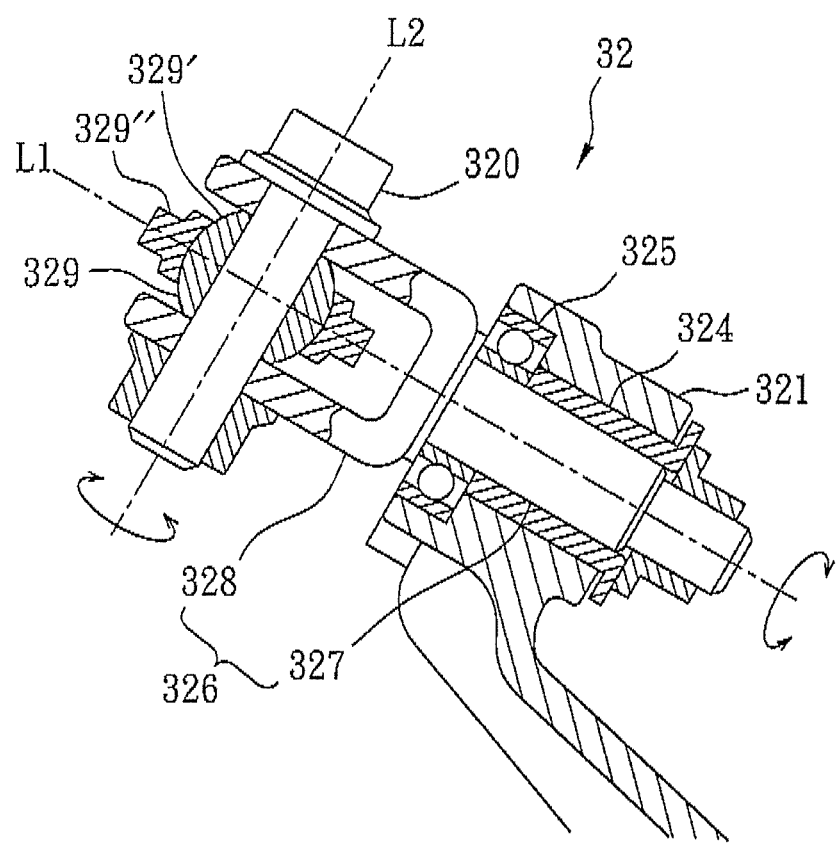
FIG. 5A is a partly sectional view of a second joint of the first preferred embodiment.
Figure 6:
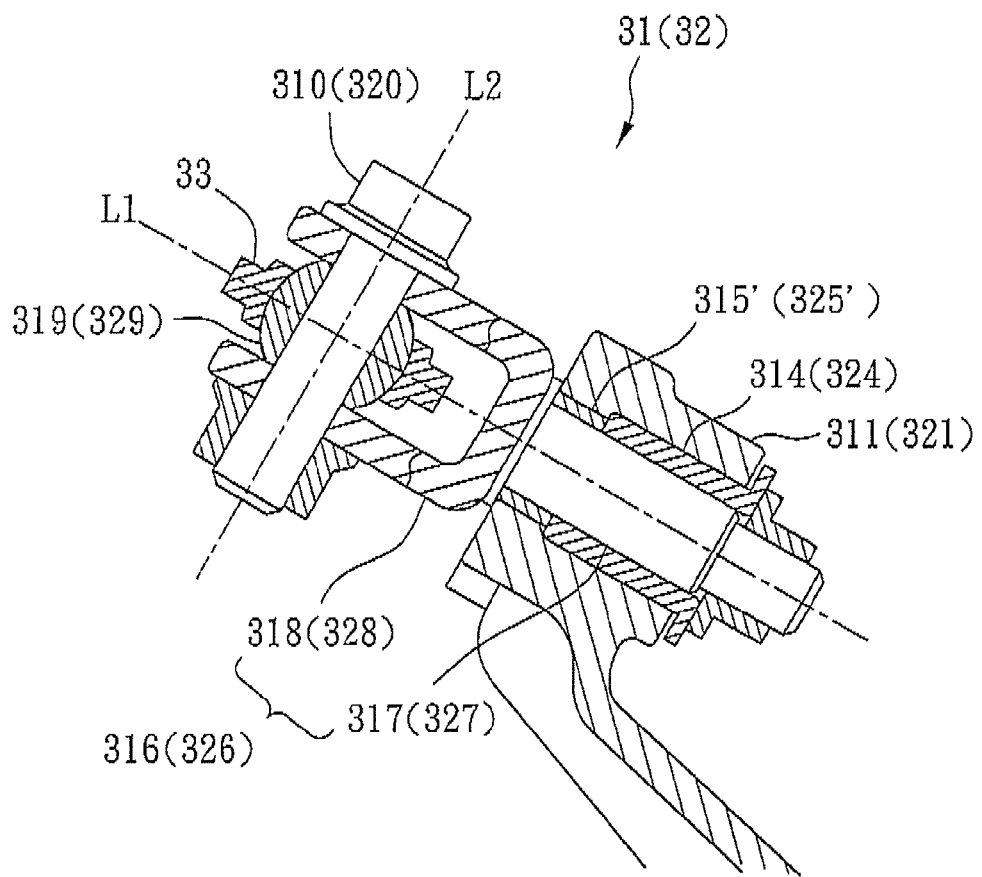
FIG. 6 is a view similar to FIG. 5 but illustrating a bushing.

With further reference to FIGS. 5 and 5A, each of the first and second joints 31, 32 includes a seat 311, 321, a sleeve 314, 324 disposed fixedly within the seat 311, 321, a bearing 315, 325 disposed within the seat 311, 321, a first rotating member 316, 326, and a second rotating member 319, 329. The first joint 31 is similar in construction to the second joints 32 except for the second rotating members 319, 329. The seat 311 of the first joint 31 is disposed on a bottom end of the control rod 22. The seats 321 of the second joints 32 are disposed respectively on the suspension units 24, and are aligned with the seat 311 of the first joint 32 in a horizontal direction. The first rotating member 316, 326 of each of the first and second joints 31, 32 includes a rotating portion 317, 327 extending through the corresponding sleeve 314, 324 and the corresponding bearing 315, 325, a U-shaped mounting portion 318, 328 connected fixedly to the rotating member 317, 327, and a fixed pin 310, 320 disposed fixedly on the mounting portion 318, 328. The bearings 315, 325 can be replaced with bushings 315', 325' (see FIG. 6). The second rotating member 319 of the first joint 31 has a main body 319' sleeved rotatably on the corresponding fixed pin 310, and two connecting portions 319" disposed fixedly on the main body 319' and connected respectively and fixedly to the connecting bars 33. The second rotating member 329 of each of the second joints 32 has a main body 329' sleeved rotatably on the corresponding fixed pin 320, and a connecting portion 329" disposed fixedly on the main body 329' and connected fixedly to the corresponding connecting bar 33. As such, each of the first rotating members 316, 326 is rotatable relative to the corresponding seat 311, 321 about a central axis (L1) thereof, and each of the second rotating members 319, 329 is rotatable relative to the corresponding first rotating member 316, 326 about a central axis (L2) thereof, which is perpendicular to the central axis (L1). As such, the sleeve 314, 324 and the bearing 315, 325 of each of the first and second joints 31, 32 are arranged along the central axis (L1) of the corresponding first rotating member 316, 326. The sleeves 314, 324 are disposed for positioning the rotating portions 317, 327 within the seats 311, 321, respectively. The bearings 315, 325 are disposed for facilitating rotation of the rotating portions 317, 327, respectively.

With particular reference to FIGS. 3 and 5, when the control rod 22 is operated to activate the first and second joints 31, 32 and the connecting bars 33 to thereby drive rotation of the suspension units 24 and the front wheels 25, since the first and second rotating members 316, 326, 319, 329 of each of the first and second joints 31, 32 are rotatable relative to each other, wear experienced by the first and second joints 31, 32 is reduced.

Figure 7:
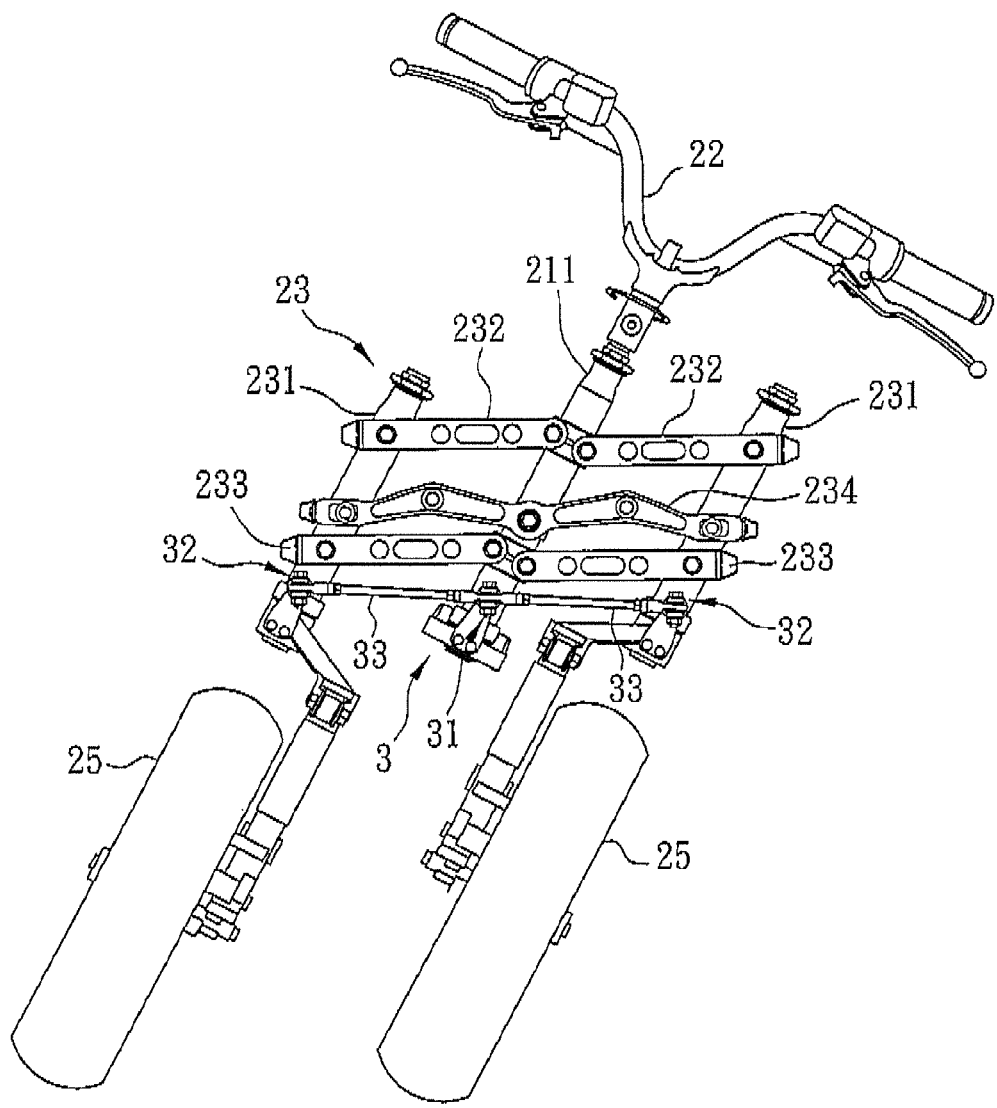
FIG. 7 is a schematic front view of the vehicle including the first preferred embodiment, illustrating that two front wheels are turned by a large angle.
Figure 8:
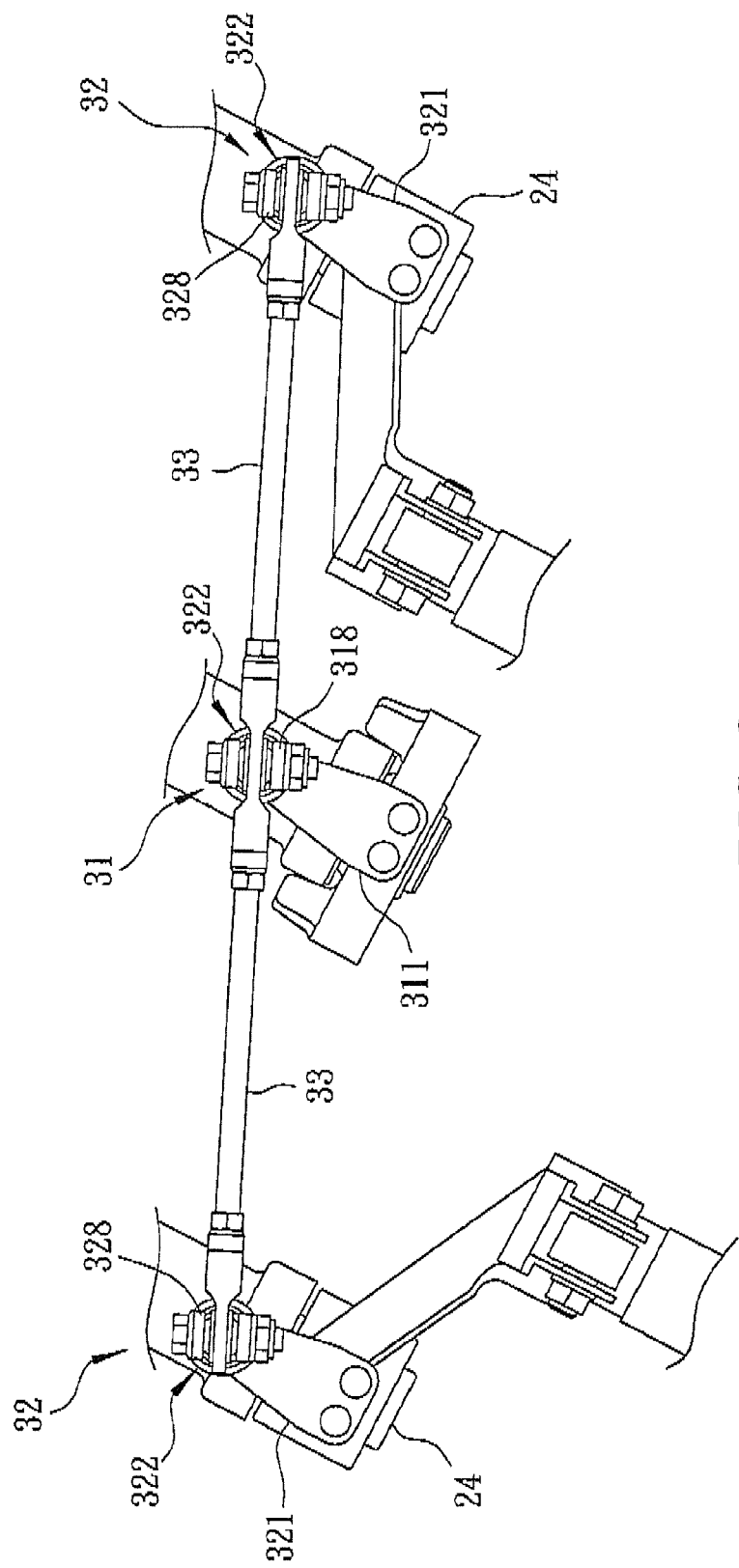
FIG. 8 is a fragmentary front view of the vehicle including the first preferred embodiment.

With particular reference to FIGS. 5, 7, and 8, when it is desired to turn the vehicle 2 by a large angle of about 40°, the control rod 22 is usually reclined to facilitate the steering operation. Upon recline of the control rod 22, due to presence of the upper and lower links 232, 233 and the connecting rod 234 of the reclining unit 23 connected between the head tube 211 and the side tubes 231, all of the suspension units 24 and the front wheels 25 are reclined synchronously with the control rod 22. At this time, since the second rotating members 319, 329 can rotate relative to the first rotating members 316, 326, respectively, the rotational angles of the second rotating members 319, 329 and the connecting bars 33 can be increased to promote the controllability of the vehicle 2 during a steering operation.

Figure 9:
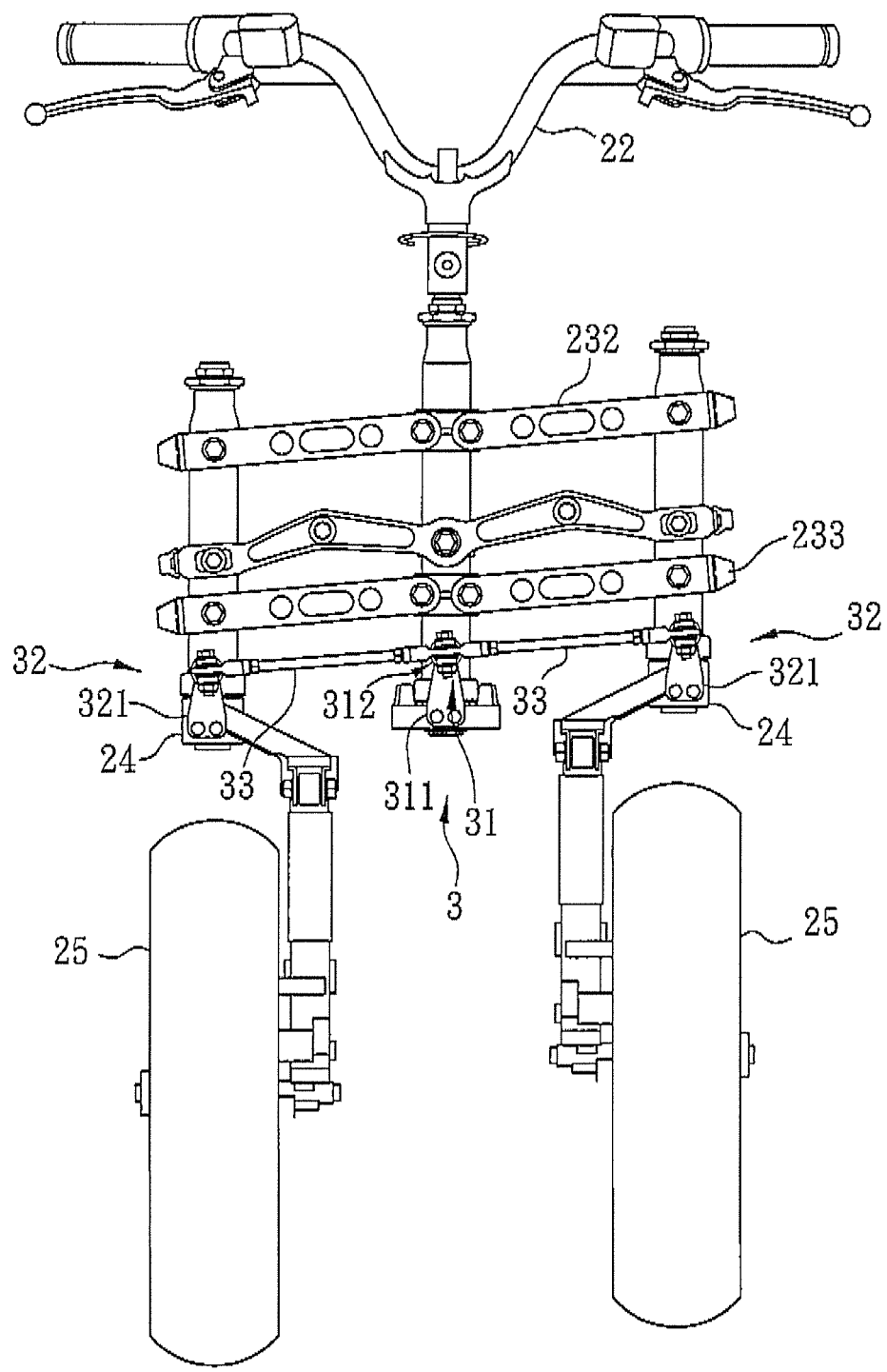
FIG. 9 is a schematic front view of the vehicle including the first preferred embodiment, illustrating a case where the vehicle moves on a dumped road surface.

With particular reference to FIGS. 5 and 9, when the front wheels 25 move on a dumped road surface such that the upper and lower links 232, 233 of the reclining unit 23 are reclined, since the first and second rotating members 316, 326, 319, 329 of each of the first and second joints 31, 32 are rotatable relative to each other, and since each of the connecting bars 33 is rotatable with the second rotating member 319 of the first joint 31 and the second rotating member 329 of the corresponding second joint 32, shock are absorbed by the whole steering apparatus 3, but not by only the second joints 32. Consequently, the service life of the steering apparatus 3 can be prolonged.

Figure 10:
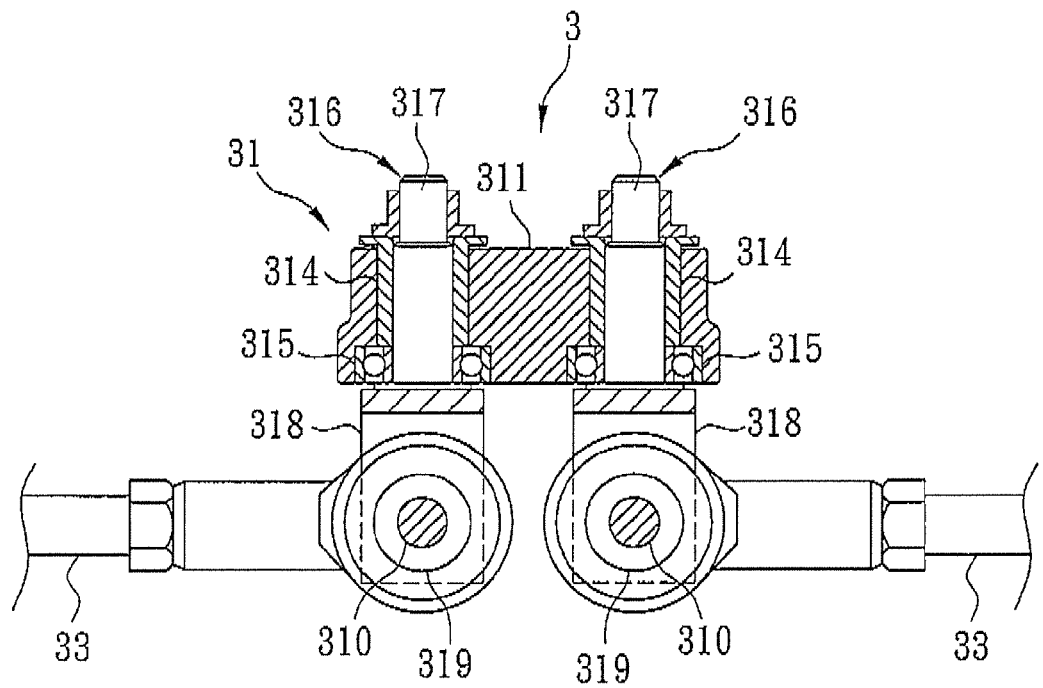
FIG. 10 is a fragmentary, partly sectional view of the second preferred embodiment of a steering apparatus according to this invention, illustrating a modified first joint.

Referring to FIG. 10, the second preferred embodiment of a steering apparatus 3 according to this invention includes a modified first joint 3. Unlike the first preferred embodiment, the modified first joint 3 includes two sleeves 314 disposed fixedly within the seat 311 and spaced apart from each other, two bearings 315 aligned respectively with the sleeves 314, two first rotating members 316, and two second rotating members 319. Each of the first rotating members 316 includes a rotating portion 317 extending through a respective one of the sleeves 314 and a respective one of the bearings 315, a mounting portion 318 connected fixedly to the rotating portion 317, and a fixed pin 310 disposed fixedly on the mounting portion 318. The second rotating members 319 are sleeved respectively and rotatably on the fixed pins 310 of the first rotating members 316, and are connected respectively and fixedly to the connecting bars 33.

Figure 11:
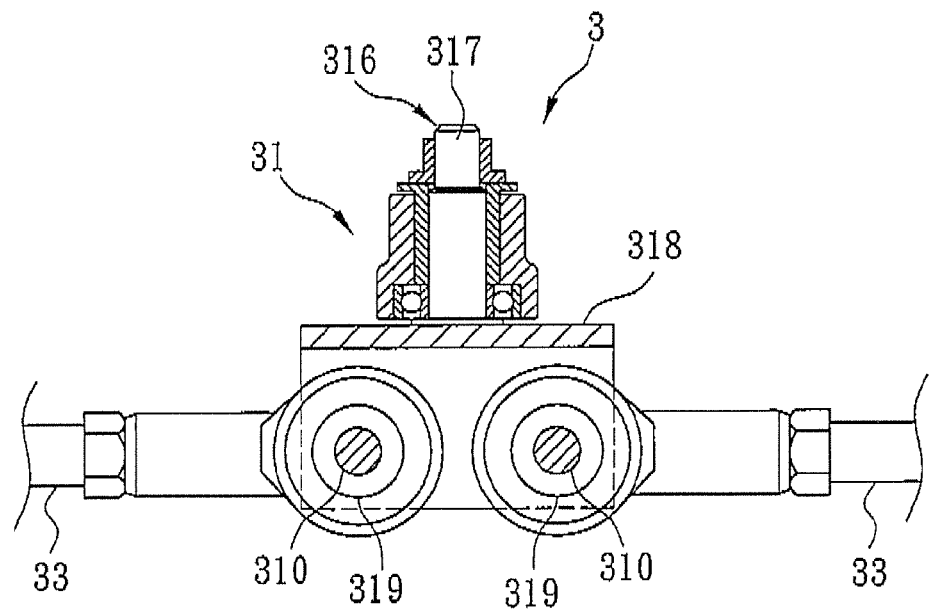
FIG. 11 is a fragmentary, partly sectional view of the third preferred embodiment, illustrating another modified first joint.

FIG. 11 shows the third preferred embodiment of a steering apparatus 3 according to this invention, which differs from the first preferred embodiment in that, in this embodiment, the first joint 31 includes a modified first rotating member 316 and two second rotating members 319. The modified first rotating member 316 includes a rotating portion 317, a mounting portion 318 connected fixedly to the rotating portion 317, and two fixed pins 310 disposed fixedly on the mounting portion 318 and parallel to each other. The second rotating members 319 are sleeved respectively and rotatably on the fixed pins 310, and are connected respectively and fixedly to the connecting bars 33.

Figure 12:
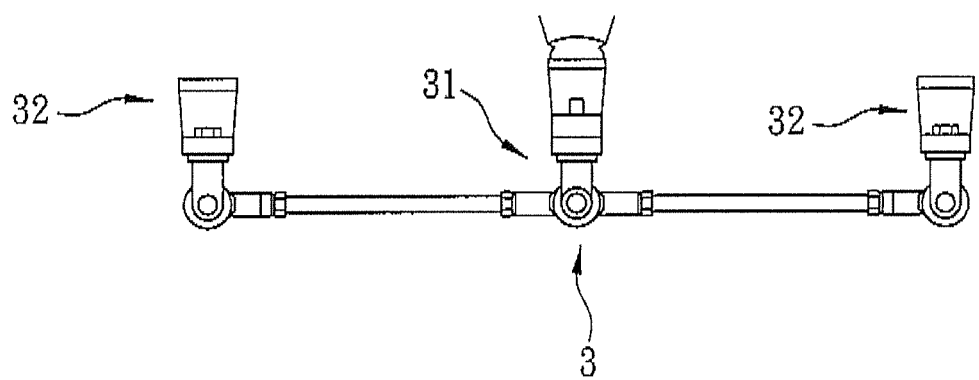
FIG. 12 is a schematic top view of the fourth preferred embodiment of a steering apparatus according to this invention.

FIG. 12 shows the fourth preferred embodiment of a steering apparatus 3 according to this invention, which differs from the first preferred embodiment in that, the second joints 32 are configured as universal joints. Since the universal joints are available with relative ease, the manufacturing costs of the steering apparatus 3 can be reduced.

In view of the above, since each of the first rotating members 316, 326 is rotatable relative to the corresponding seat 311, 321 about the central axis (L1) thereof, and since each of the second rotating members 319, 329 is rotatable relative to the corresponding first rotating member 316, 326 about the central axis (L2) thereof, the controllability of the vehicle 2 with respect to the steering angle is promoted. Furthermore, relative rotation between the first and second rotating members 316, 326, 319, 329 can result in an increase in the shock-absorbing ability and, thus, the service life of the steering apparatus 3.

With this invention thus explained, it is apparent that numerous modifications and variations can be made without departing from the scope and spirit of this invention. It is therefore intended that this invention be limited only as indicated by the appended claims.

We claim:

1. A steering apparatus for a vehicle, the vehicle including a frame having a head tube, a control rod extending rotatably through the head tube, a reclining unit disposed on the head tube, two suspension units connected to and disposed under the reclining unit, and two front wheels connected respectively to the suspension units, the reclining unit including two side tubes flanking the head tube, the suspension units extending respectively into the side tubes, said steering apparatus comprising a first joint adapted to be disposed on the control rod, two second joints adapted to be disposed respectively on the suspension units, and two connecting bars each connected between said first joint and a respective one of said second joints, wherein said first joint includes a seat adapted to be disposed fixedly on the control rod, at least one first rotating member having a central axis and rotatable on said seat about said central axis of said first rotating member, and at least one second rotating member having a central axis and rotatable on said first rotating member about said central axis of said second rotating member, said axes of said first and second rotating members of said first joint being perpendicular to each other.

2. The steering apparatus as claimed in claim 1, wherein each of said second joints includes a seat adapted to be disposed on a corresponding one of said suspension units, a first rotating member having a central axis and rotatable on said seat about said central axis of said first rotating member, and a second rotating member having a central axis and rotatable on said first rotating member about said central axis of said second rotating member, said axes of said first and second rotating members of each of said second joints being perpendicular to each other, each of said connecting bars having two ends connected respectively and fixedly to said second rotating members of said first joint and a corresponding one of said second joints.

3. The steering apparatus as claimed in claim 2, wherein each of said first and second joints further includes a sleeve and a bearing that are disposed within the seat and that are arranged along said central axis of said first rotating member, said first rotating member of each of said first and second joints including a rotating portion extending through said sleeve and said bearing of a corresponding one of said first and second joints in such a manner to allow for rotation of said rotating portion within said seat of a corresponding one of said first and second joints, a mounting portion connected fixedly to said rotating portion, and a fixed pin disposed fixedly on said mounting portion, said second rotating members of each of said first and second joints being sleeved rotatably on said fixed pin of a corresponding one of said first and second joints.

4. The steering apparatus as claimed in claim 2, wherein each of said first and second joints further includes a sleeve and a bushing that are disposed within the seat and that are arranged along said central axis of said first rotating member, said first rotating member of each of said first and second joints including a rotating portion extending through said sleeve and said bearing of a corresponding one of said first and second joints in such a manner to allow for rotation of said rotating portion within said seat of a corresponding one of said first and second joints, a mounting portion connected fixedly to said rotating portion, and a fixed pin disposed fixedly on said mounting portion, said second rotating members of each of said first and second joints being sleeved rotatably on said fixed pin of a corresponding one of said first and second joints.

5. The steering apparatus as claimed in claim 1, wherein said first joint further includes two sleeves disposed within said seat and spaced apart from each other, and two bearings disposed within said seat and aligned respectively with said sleeves, said first joint including two said first rotating members each including a rotating portion extending through a respective one of said sleeves and a respective one of said bearings, a mounting portion connected fixedly to said rotating portion, and a fixed pin disposed fixedly on said mounting portion, said first joint including two said second rotating members that are sleeved respectively and rotatably on said fixed pins of said first rotating members.

6. The steering apparatus as claimed in claim 1, wherein said first joint further includes a sleeve and a bearing that are disposed within said seat and that are arranged along said central axis of said first rotating member, said first rotating member including a rotating portion extending through said sleeve and the bearing, a mounting portion connected fixedly to said rotating portion, and two fixed pins disposed fixedly on said mounting portion, said first joint including two said second rotating members sleeved respectively and rotatably on said fixed pins and connected respectively and fixedly to said connecting bars.

7. The steering apparatus as claimed in claim 1, wherein each of said second joints is configured as a universal joint.

* * * * *